United States Patent [19]
Robinson

[11] 4,273,073
[45] Jun. 16, 1981

[54] CIRCULATING FLUIDIZED BED BOILER

[75] Inventor: Edwin Robinson, Darlington, England

[73] Assignee: Deborah Fluidised Combustion Limited, Peterlee, England

[21] Appl. No.: 43,931

[22] Filed: May 30, 1979

[30] Foreign Application Priority Data

May 31, 1978 [GB] United Kingdom ............... 25699/78

[51] Int. Cl.³ ............................................. F23C 11/02
[52] U.S. Cl. .................................. 122/4 D; 110/245; 110/264
[58] Field of Search ................ 122/4 D; 110/245, 264

[56] References Cited

U.S. PATENT DOCUMENTS

| | | | |
|---|---|---|---|
| 4,183,330 | 1/1980 | Bryers et al. | 122/4 D |
| 4,184,438 | 1/1980 | Bryers et al. | 122/4 D |
| 4,184,455 | 1/1980 | Talmud et al. | 122/4 D |
| 4,184,456 | 1/1980 | Taylor et al. | 122/4 D |

*Primary Examiner*—Anthony V. Ciarlante
*Attorney, Agent, or Firm*—Reising, Ethington, Barnard, Perry & Brooks

[57] ABSTRACT

A boiler in which the combustion unit includes a fluidized bed which may be fluidized in a non-uniform manner to effect circulation of the bed material. Heat exchange takes place between the combustion products and working fluid located in tubes located above the fluidized bed and also, optionally, within the fluidized bed.

6 Claims, 5 Drawing Figures

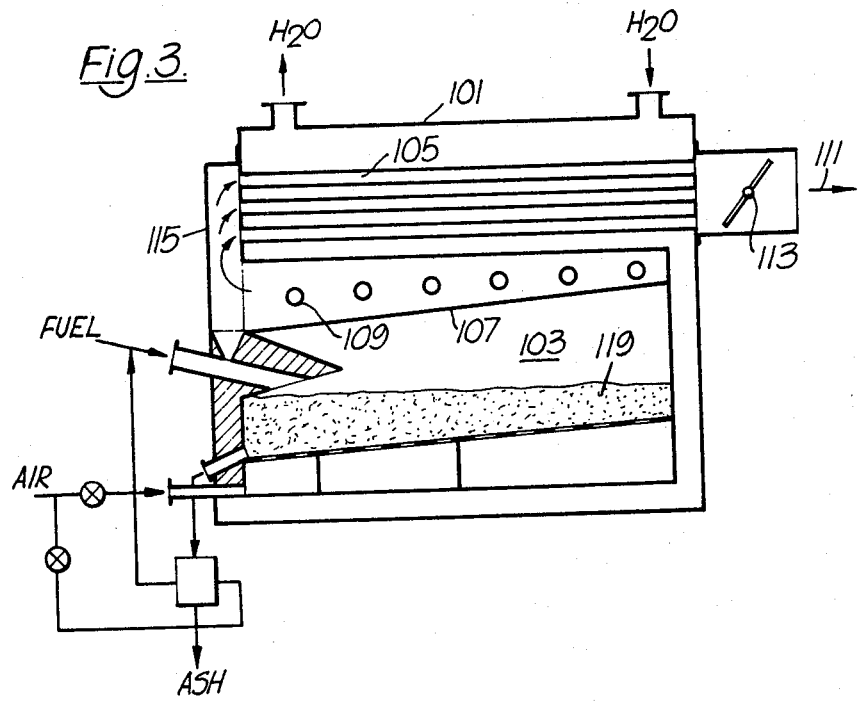
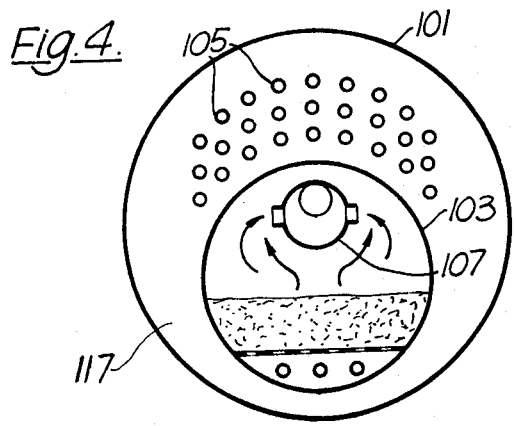

CIRCULATING FLUIDIZED BED BOILER

This invention relates to boilers.

Solid fuel boilers require stoking of the fuel in order to achieve efficient combustion thereof. Automatic mechanical stoking has proved more efficient than manual stoking, due to better control of fuel/air ratios. The use of a fluidised bed has led to a further improvement in that the amount of excess air required for efficient combustion is much lower than with automatic mechanical stoking.

Boilers utilising a conventional fluidised bed are such that a substantially vertical turbulent motion is produced within the bed, due to the flow of gases upwardly through the bed. The intimate mixing of fuel and air within the bed allows higher combustion rates per unit area of grate than could be achieved by mechanical stoking. However, a plurality of fuel inlets, or at least a single fuel inlet with a mechanical device for distributing or scattering the fuel over the surface of the bed, is required in order to give a good distribution of fuel over the grate area and the feeding of the fuel through the various inlets has to be carefully balanced in order to give most efficient combustion by the bed as a whole. Furthermore, volatile or finely divided fuels cannot readily be burned in an efficient manner as the vertical passage of gases through the bed allows insufficient time for complete combustion. In addition the spent fuel, such as heavy ash, can be difficult to remove from the bed and can cause blockage of the air inlets unless a plurality of ash extraction outlets are provided so as to cover the grate area.

According to the present invention there is provided a boiler comprising fuel burning means and means for allowing heat exchange between the products of combustion of the fuel and a working fluid, the fuel burning means including a bed of particulate material and means for fluidising the bed in a non-uniform manner to effect circulation of the bed material within the bed.

Preferably the heat exchange means include a plurality of tubes either through or around which the combustion gases may be passed and, respectively, either around or through which the working fluid may be passed. More preferably these passages are arranged substantially horizontally above said bed. The arrangement may be a so-called single pass system in which the gas flow through the passages is in one direction only before leaving the boiler. Alternatively, the arrangement may be a so-called double pass system whereby gases flow in one direction through passages and are redirected through further passages before leaving the boiler.

Preferably the heat exchange means further include means for feeding working fluid within a conduit through the bed itself, thereby both to cool the bed and also to receive heat therefrom. Preferably, the working fluid exiting from said conduit is then fed therefrom to said plurality of passages.

Preferably the bed is arranged within a chamber located within the boiler, the working fluid being, in use, passed through the space defined by the exterior of the chamber wall and the interior of the boiler wall and the bed material extending so as to contact the interior of the chamber wall over at least a portion thereof. In this way a substantial heat exchange can take place between the bed and the water outside the chamber and this increases the over-all efficiency of heat exchange and ensures that the fluidised bed does not become too hot.

Preferably the bed fluidising means include means for feeding air into the bed and the bed includes a spent fuel outlet, the arrangement being such that air may be pre-heated by spent fuel before the air is fed to the bed. For instance the spent fuel may be ash, which contains a great deal of heat and this hot ash may be used to pre-heat the air, the pre-heated air then being mixed with the fuel so that it is used to pump the fuel on to the fluidised bed.

Preferably the boiler includes a single fuel inlet to the bed. With known boilers utilising fluidised beds, it is necessary to provide a plurality of fuel inlets so as to give a good distribution of fuel over the grate area, as mentioned above. However, in the case of the boiler of the present invention only a single fuel inlet is necessary because the bed is fluidised in such a way that there is a circulation of the bed material thereby distributing the fuel throughout the bed.

Preferably the air feeding means for the fluidised bed are arranged to feed air through the base of the bed. Underneath the base of the bed there may be arranged side by side plenum chambers, the amount of air fed to each plenum chamber and/or the size of each plenum chamber varying so that the amount of air injected into the bed is non-uniform in such a way as to cause the circulating motion of the bed material within the bed.

In the case where working fluid is passed, within a conduit, through the bed itself, it is particularly preferred that the conduit extends across that region of bed subjected to the greatest air flow. It is also preferred that a deflector or partition be located above the bed at the region of greatest air flow. It has been found that for a bed where the maximum air flow velocity in the bed is about 16 ft/sec, the heat transfer was about 80 BTU/hr/sq ft/° F. whereas the heat transfer in a comparable non-circulating fluidised bed boiler was only about 50 BTU/hr/sq ft/° F.

Included within the scope of the present invention is fuel combustion means adapted for fitting to a boiler, said fuel combustion means comprising a bed for receiving particulate material and means for fluidising material in the bed in a non-uniform manner to effect circulation of said material within the bed. Such fuel combustion means may be used to replace, for instance, an oil burner in an existing boiler.

A boiler in accordance with the present invention may use any fuel and it is a particular advantage that the boiler may operate efficiently with fuel having a low calorific value, for instance, low grade coal or municipal refuse. The fuel may be solid, liquid or gaseous although only soild fuels give rise to a large amount of ash. Accordingly, it is a particular advantage that a boiler in accordance with the present invention can utilise fuels with high ash content. These are not normally burnt because the amount of heat lost in the ash is very high. Thus, such fuels have the same transportation costs as high grade fuels, but a large percentage of the potential heat output has hitherto been discarded with the ash.

Because the material in the bed is caused to circulate and especially if the floor of the bed is inclined, the removal of defluidised ash is relatively simple due to the gravity flow of ash to the lowest end of the bed keeping the distributor clear. In known boilers, the heavy ash tends to build up within the bed and eventually the bed becomes defluidised blocking the distributor and is not then capable of supporting combustion.

The particulate bed material may be inert, for instance, a silica sand or it may be reactive, for instance calcium carbonate which will react with sulphur in the fuel to form calcium sulphate, thereby reducing the emission of sulphur into the atmosphere.

Embodiments of the present invention will now be described, by way of examples only, and with reference to the accompanying drawings in which:

FIG. 3 is a diagrammatic view of another embodiment of a boiler in accordance with the present invention;

FIG. 4 is a transverse section of the boiler of FIG. 3; and

Figure 1:
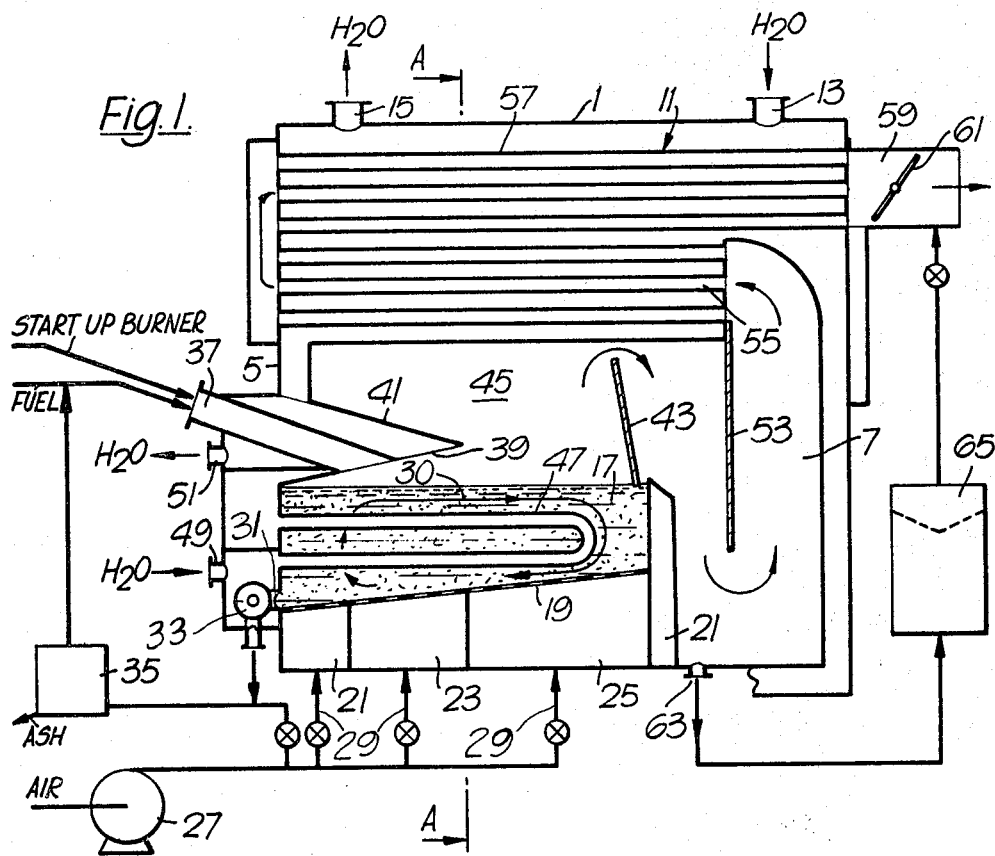
FIG. 1 is a diagrammatic view of a boiler in accordance with the present invention.
Figure 2:
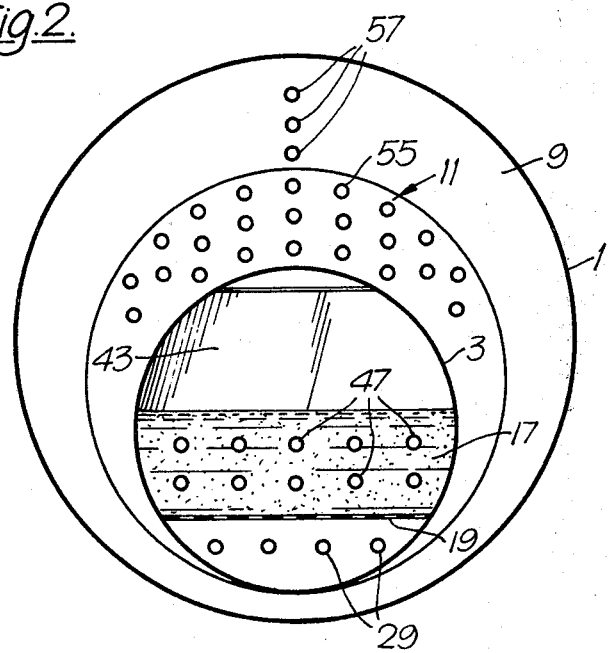
FIG. 2 is a transverse section of the boiler of FIG. 1.

Referring to FIGS. 1 and 2, a boiler in accordance with the present invention includes a shell 1, within which is mounted a combustion chamber 3 which extends from one end wall 5 of the boiler substantially the whole of the length of the boiler, terminating in a flue back 7.

Located within the space 9 defined by the exterior of the wall of chamber 3 at the interior of the wall of the shell 1 is a space 9 within which is located a plurality of tubes 11. The shell is provided with inlet 13 and outlet 15, whereby water may be circulated around tubes 11.

Located within chamber 3 is a fluidised bed 17, the side walls of which are provided by the wall of chamber 3, bed 17 having a flat base 19 which slopes upwardly from end wall 5 of the boiler to rear wall 21 of the fluidised bed. Located below base 19 are plenum chambers 21, 23 and 25 which increase in size from end wall 5 to rear wall 21. Air is supplied to each of the plenum chambers by pump 27, the air being fed to positions within the plenum chambers along distribution tubes 29. Base 19 is perforated to allow air to pass into the bed from the plenum chambers.

Bed 17 is filled with a suitable particulate material 30 such as silica sand or calcium carbonate up to a level just below the top of rear wall 21.

The bed 17 is provided with an outlet 31 to which outlet 31 is connected an ash extraction device 33 whereby ash may be extracted from the bed and passed to an ash and bed separator device 35. It will be noted that outlet 31 is at the lowest part of the bed where, under the influence of gravity and due to the circulation of the bed material, the ash tends to collect.

During the passage of ash to the separator device 35, air is mixed with the ash under the influence of pump 27. This air then extracts heat from the ash and is subsequently passed, together with separated bed material, from the separator device 35 to fuel inlet 37 after having been mixed with the fuel which is to be burnt. Ash which has been separated in device 35 is discarded.

As shown in FIG. 1, fuel inlet 37 inclines downwardly through the end wall of the boiler and terminates within the boiler above the fluidised bed 17, opening into the space above the bed at an inclined partition member 39 which forms a deflector ensuring good circulation of bed material and restricting the depth of the bed material above the region of greatest air flow thereby assisting heat transfer in the bed. Partition member 39 is connected to return partition 41 and these partitions, together with the wall of the combustion chamber and rear partition 43, define an expansion space 45 which reduces the velocity of the flue gases produced by the combustion.

Located within the bed 17 so as to be completely surrounded by bed material 30, are a series of tubes 47, each tube 47 being U-shaped, the arms of the tube 47 being arranged in a vertical plane and opening at the front wall of the fluidised bed 17. These tubes 47 enable water, passed through inlet 49, to extract heat from the bed, thereby to cool it, passing out through outlet 51. In this way the boiler feed water may be preheated by connecting outlet 51 to boiler inlet 13, or by connecting outlet 15 to inlet 49 a degree of super heat may be achieved. Alternatively, the two water circuits may be separate. The tubes 47 extend at least across the bed above plenum chambers 21 and 23 where air flow is greatest, since it is in this region where heat transfer is most efficient.

Since air is forced through base 19 into bed 17 by pump 27 via chambers 21, 23 and 25 at different velocities, the bed 17 is caused to expand to the extent allowed by partition member 39. At the same time the bed material circulates in the direction shown by arrow 30, the movement being guided by member 39 at the top left hand portion of the bed. As a result of this movement of the bed material, the fuel, even though entering the boiler through only a single inlet, is distributed throughout the bed thereby ensuring efficient combustion of the fuel even if finely divided. In addition, the defluidised ash collects at outlet 31 as mentioned above. Furthermore, the residence time of fuel in the bed is high compared with a fluidised bed in which no such circulating movement takes place, thus combustion is more complete.

The flue gases released from the bed pass upwardly into expansion space 45 and then downwardly between partitions 43 and 53 and thence, into flue back 7 where they travel upwardly again before entering lower tubes 55 of the set of tubes 11. The gases pass along lower tubes 55 from the rear of the boiler at the front end and then return along the whole of the length of the boiler along upper tubes 57 of the series of tubes 11, exiting from the boiler through outlet 59 controlled by butterfly valve 61. During the passage of the gases through tubes 11, they exchange heat with water circulated around the tubes.

A portion of the flue gases, carrying fine ash particles, is sucked through outlet 63 at the base of the boiler. This particle/gas mixture is fed to ash separator 65 where the fine ash is separated from the gas, the latter being then fed to outlet 59.

Referring to FIGS. 3 and 4, another boiler in accordance with the present invention comprises a shell 101 within which is located a combustion chamber 103, the space between combustion chamber 103 and the wall of shell 101 being provided with tubes 105 around which water may be circulated. In this case, however, gases from the combustion chamber 103 pass into conduit 107 through ports 109 and thence to the front of boiler 101 where they enter tubes 105. The gases pass through tubes 105 from the front to the back of the boiler and enter outlet 111 controlled by butterfly valve 113. Thus the gas makes only a single pass through the boiler although in another similar embodiment, the arrangement may be a double pass system as with the boiler described with reference to FIGS. 1 and 2.

As with the FIGS. 1 and 2 embodiment, the boiler of FIGS. 3 and 4 is a wet back boiler, the water passing into space 115 at the back of the combustion chamber and also circulating under the combustion chamber within space 117.

Within combustion chamber 103 there is a fluidised bed, the wall of which is provided entirely by the wall of chamber 103. Within the bed there is provided particulate material 119 which may be inert material such as silica sand or catalytic material such as calcium carbonate.

The boiler of FIGS. 3 and 4 may otherwise be similar to that of FIGS. 1 and 2. It may be provided with heat exchange tubes located within the bed, similar to tubes 47 of the embodiment of FIGS. 1 and 2, although these are not shown in FIGS. 3 and 4.

Figure 5:
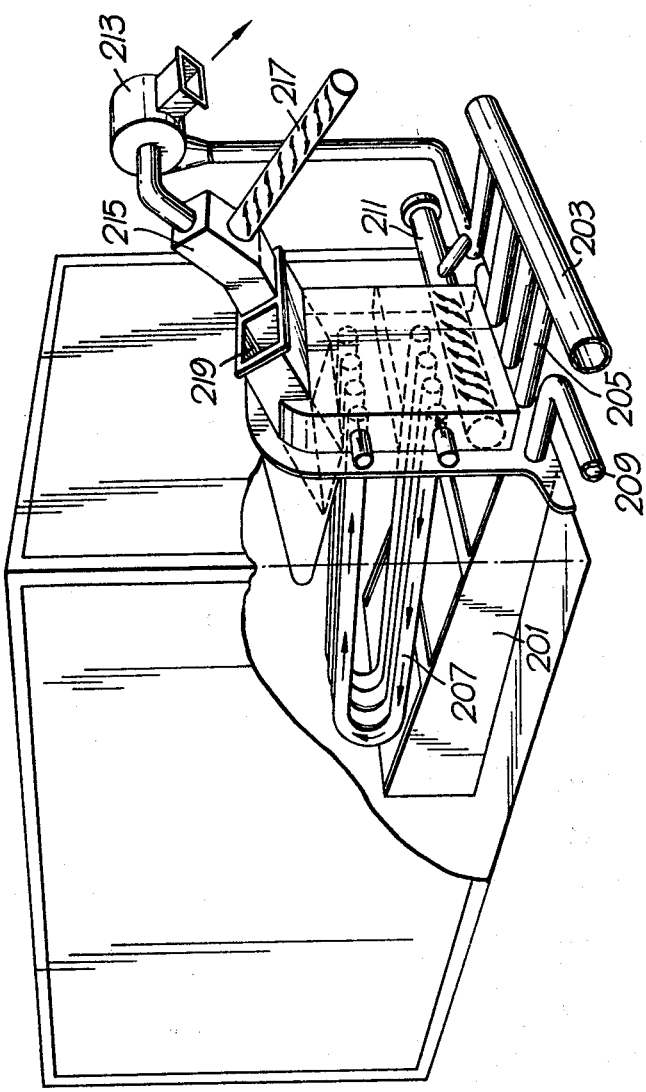
FIG. 5 is a diagrammatic view of a fuel burner in accordance with the present invention.

Referring to FIG. 5, there is shown a combustion device for fitting to an existing boiler. The existing boiler may have previously been fitted with an oil burner but it may be desired to replace this with a solid fuel burner.

The combustion device is broadly similar to that shown in the boiler of FIGS. 1 and 2 and includes an arrangement of plenum chambers 201 to which air may be fed by tubes 203 and 205. The bed material would be placed over the grates of the plenum chambers so as to surround water cooling tubes 207. Fly ash falling through the grate may be removed through outlet 209. Heavier ash collecting at the lower end of the bed may be extracted by means of ash extractor 211 and then mixed with air before being fed to separator device 213. Pre-heated air together with bed material which has been separated from the ash in device 213 is then fed to inlet 215. It is mixed at inlet 215 with fuel, which in this case is coal, fed to inlet via coal feed 217. The combustion system is provided with a start-up burner 219 and when the system is fitted to a boiler it operates in a manner similar to that described with reference to the boiler of FIGS. 1 and 2.

We claim:

1. A boiler comprising: a combustion chamber having an exterior surface, means for circulating water about the exterior surface of said combustion chamber, tubes located within said means for circulating water, means for feeding combustion gases from said combustion chamber through said tubes located within said means for circulating water, a bed for receiving particulate material, said bed being enclosed within said combustion chamber and having first and second opposite ends, said bed also having a base which is inclined upwardly from said first end thereof to said second end thereof, means for feeding air to said bed to effect fluidisation of said material and circulation of said material by movement thereof from said first end to said second end in an upper region of the bed and from said second end to said first end in a lower region of the bed, and deflection means located over the bed material adjacent said first end to limit expansion of the bed adjacent said first end.

2. A boiler according to claim 1, wherein the tubes are arranged substantially horizontally.

3. A boiler according to claim 1, wherein the tubes are arranged as a single pass system in which the gas within the tubes passes through the boiler only once before leaving the boiler.

4. A boiler according to claim 1, wherein the tubes are arranged in a double pass system in which the gas within the tubes passes through the boiler twice before leaving the boiler.

5. A boiler according to claim 1 further including heat exchange means having a conduit for feeding water through the bed, the conduit extending at least across the region of said bed adjacent the first end thereof.

6. A boiler according to claim 1, wherein the bed includes a spent fuel outlet, means for mixing air with the spent fuel to pass heat from the spent fuel to the air, and means for feeding the air heated by the spent fuel back to the boiler.

* * * * *